J. P. RAYMOND.
ATOMIZING APPARATUS FOR MAKING FIBROUS FORMS AND CONTAINERS.
APPLICATION FILED MAR. 5, 1918.
1,284,927.  Patented Nov. 12, 1918.
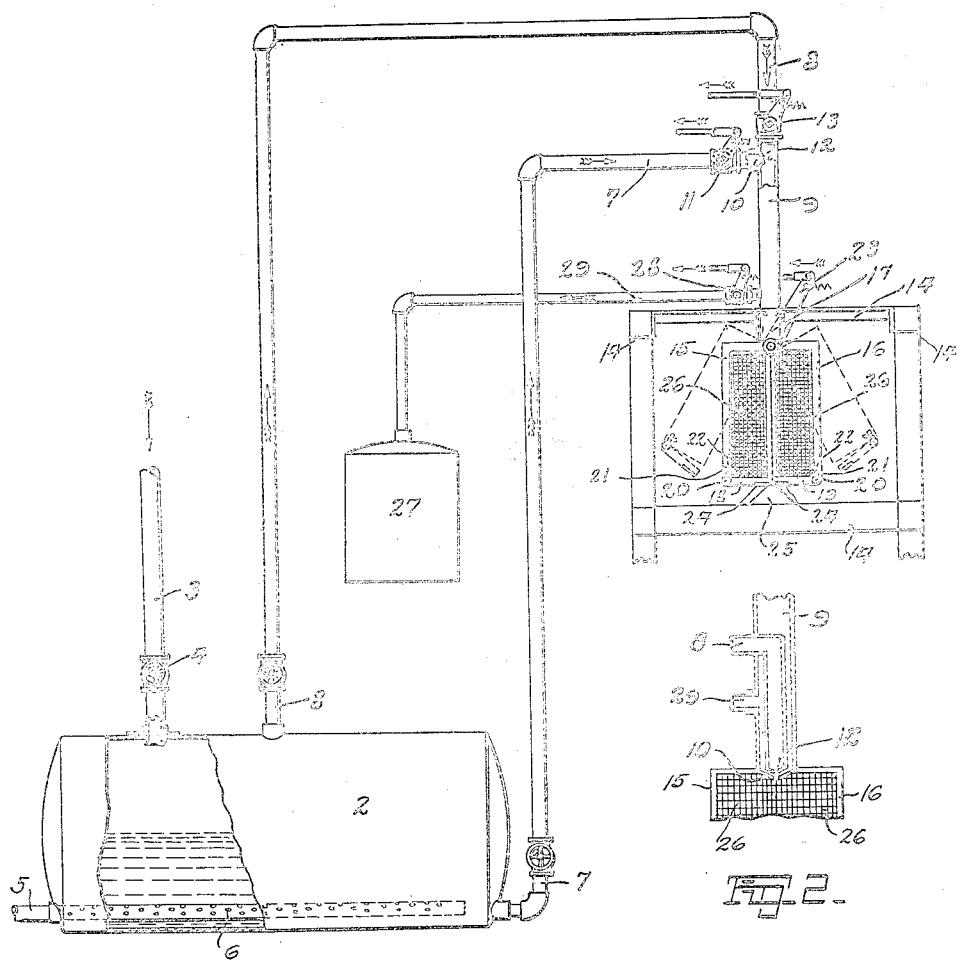
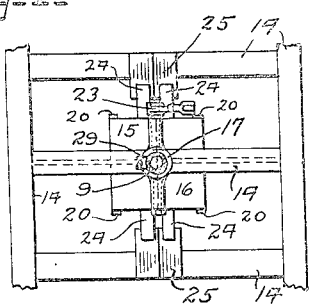
INVENTOR.
JOHN P. RAYMOND
BY
*Francis St. J. Fox*
ATTORNEY

UNITED STATES PATENT OFFICE.

JOHN P. RAYMOND, OF SAN FRANCISCO, CALIFORNIA.

ATOMIZING APPARATUS FOR MAKING FIBROUS FORMS AND CONTAINERS.

1,284,927. Specification of Letters Patent. Patented Nov. 12, 1918.

Application filed March 5, 1918. Serial No. 220,567.

*To all whom it may concern:*

Be it known that I, JOHN P. RAYMOND, a citizen of the United States, and a resident of the city and county of San Francisco and State of California, have invented an Improvement in an Atomizing Apparatus for Making Fibrous Forms and Containers; and I do hereby declare the following to be a full, clear, and exact description of my invention, such as will enable others skilled in the art to which it appertains to make and use the same.

This invention relates to an atomizing vacuum apparatus for making forms and containers from any suitable fibrous cohesive substances, such as wood or paper pulp and the like; and it consists in the novel construction, combination and arrangement of parts as hereinafter described.

The object of my invention is to provide an apparatus by means of which the said forms and containers may be quickly and efficiently manufactured at a low manufacturing cost.

In order that my invention may be clearly understood and readily carried into effect, the same is described with reference to the accompanying drawings, in which similar numerals indicate like parts:—

Figure 1, is a side elevation of the complete structure, partly broken away and partly in section.

Fig. 2, is a vertical sectional view of a modified form of construction showing the mixture and compressed air nozzles closer to the mold.

Fig. 3, is a plan view of the mold looking downward.

In detail, my construction consists of a longitudinally disposed pneumatic tank, 2, adapted to receive a mixture of fibrous pulp and water through the inlet-pipe, 3, connecting with a suitable reservoir, not shown in the drawings. The amount of mixture admitted to the tank is controlled by means of a suitable valve, 4. From a conveniently located source of supply, not shown in the drawings, compressed air is admitted into the tank through the inlet-pipe, 5, which extends through the left-hand head of the tank on a line parallel with its bottom and which terminates at a suitable point adjacent to the right-hand head of the tank. That portion of the inlet-pipe within the tank is provided with a series of perforations, 6, through which the compressed air escapes into the said tank. The compressed air thus admitted agitates the liquid mixture and keeps the pulp particles in said mixture from sinking to the bottom of the tank. The compressed air fills the space in the tank above the level of the mixture and exerts a force downward on the said mixture. As an outlet for the mixture, the outlet-pipe, 7, is provided in the right-hand head of said tank at a suitable point below the level of said mixture. A second outlet-pipe, 8, provided in the top of said tank constitutes an outlet for the compressed air. Both said outlet-pipes, 7 and 8, open into a feed-pipe, 9. The outer end of said outlet-pipe, 7, is provided with a nozzle, 10, which terminates slightly within said feed-pipe, 9, and through which the said mixture is expelled when the quick-acting valve, 11, is opened. The outer end of said outlet-pipe, 8, is also provided with a nozzle, 12, which terminates within said feed-pipe, 9, at a point, directly above and at right angles to said first mentioned nozzle, 10, and through which the compressed air is expelled when the quick-acting valve, 13, is opened.

Dependent from a suitable frame, 14, is a mold comprised of two parts, 15 and 16, which are suitably hinged at their upper central portions to a boss, 17, projecting downward from said frame, and which are thus adapted to swing upward and outward in opposite directions from each other when the mold is opened. The said feed-pipe, 9, opens into the said mold through the said boss, 17. Said mold is provided with a bottom comprised of two parts, 18 and 19, suitably attached at their outer portions to the said parts, 15 and 16, respectively, by means of hinges, 20. When the mold is opened the said bottom parts, 18 and 19, swing downward and away from each other. By means of arms, 21, and stops, 22, the said hinged bottom parts are prevented from dropping too far when the mold is opened. The said mold is opened and closed by means of the lever, 23. Lugs, 24, affixed to the two hinged parts comprising the said bottom and adapted to contact with the triangle bars, 25, mounted on the said frame, prevent the said mold from opening against the action of the compressed air when the said mold is closed and in use. The surfaces of the mold are provided with innumerable pores, 26, to permit the escape of the compressed air and water held in the mixture when the same are admitted into the mold. A vacuum tank, 27, controlled by a quick-acting valve, 28, is connected with the said feed-pipe, 9, by a pipe-line 29.

Shown in the drawings, Fig. 2, is a modified form of structure in which the nozzle for the mixture, 10, is located at the lower end of the feed-pipe, 9, at its point of entry into the mold; and in which the nozzle for the compressed air, 12, is located at the end of the outlet-pipe, 8, which in this instance extends downward within the feed-pipe, 9, and terminates directly above the nozzle for the said mixture. It is apparent, of course, that these nozzles may be located at varying distances from the mold, or even within the mold itself, and adequately perform their functions.

Any part of the container may be made thicker or thinner than any other part by providing larger or smaller pores in the mold, it being apparent that the compressed air will seek to escape through the larger pores first and that a thicker layer of pulp will be required to plug the larger pores.

My apparatus is operated as follows: The mixer of pulp and water is let into the pneumatic tank, partially filling the same, and the supply shut off. Compressed air is then let into the tank filling the space therein above the level of the mixture. The air in its progress constantly agitates the said mixture. The valves, 11 and 13, in the outlet-pipes, 7 and 8, respectively, are then opened, and as the column of mixture under pressure is expelled through the nozzle, 10, into the feed-pipe, 9, it is met by the column of compressed air expelled through the nozzle, 12, into the feed-pipe and the mixture atomized and converted into a spray reaching the mold in that form. The compressed air thus let into the mold in seeking to escape through the pores in the mold drives before it the particles of pulp in the atomized mixture, but as the said pores are too small to admit passage therethrough of the pulp particles the pores are gradually plugged and a layer of pulp of uniform thickness is gradually built up and formed against the inner surfaces of the mold. In seeking to escape the compressed air will follow the line of least resistance and as soon as one pore is closed it will pass out through those pores still open, with the resultant action of plugging all pores alike. At the same time the action of the compressed air drives the water held in the atomized mixture out through the said pores. When the proper thickness of the layer of pulp has been reached the column of mixture is shut off and the column of compressed air is stopped. The vacuum tank is then opened by means of the quick-acting valve, 28, for the purpose of pulling away and freeing any pulp particles constituting the layer thus produced from the mold. As the mold opens by the manipulation of the lever, 23, the hinged parts, 18 and 19, comprising its bottom swing downward and out of contact with the container thus produced and the same may be then removed without difficulty.

Having thus described my invention, what I desire to claim and secure by Letters Patent, is:

1. In an apparatus of the character described, a pneumatic tank adapted to receive a mixture of pulp and water, a suitably perforated compressed air inlet-pipe within said tank by means of which the said mixture is agitated and the said tank above the level of said mixture is filled with compressed air, means for atomizing said mixture consisting of two nozzles so disposed with relation to each other that a column of said compressed air is directed against a column of said mixture as said mixture enters a feed-pipe opening into a separable porous mold, where the pulp particles in said mixture are formed into a layer of any desired shape and thickness and the water is eliminated.

2. In an apparatus of the character described, a pneumatic tank adapted to receive a mixture of pulp and water, means for simultaneously agitating said mixture and filling said tank with compressed air above the level of said mixture, means whereby the said mixture is atomized at its point of entry into a feed-pipe opening into a separable porous mold, where, by air pressure, the pulp particles in said mixture are formed into a layer of any desired shape and thickness and the water is eliminated.

3. In an apparatus of the character described, a pneumatic tank adapted to receive a mixture of pulp and water, means for simultaneously agitating said mixture and filling said tank with compressed air above the level of said mixture, means whereby the said mixture is atomized at its point of entry into a feed-pipe opening into a separable porous mold, where, by air pressure, the pulp particles in said mixture are formed into a layer of any desired shape and thickness and the water is eliminated, in combination with means for liberating said layer from said mold.

4. In an apparatus of the character described, a pneumatic tank adapted to receive a mixture of pulp and water, means for agitating said mixture, means for filling said tank with compressed air above the level of said mixture, means whereby said mixture is atomized and let under air pressure into a separable porous mold where the pulp particles in said mixture are formed into a layer of any desired shape and thickness and the water is eliminated.

5. In an apparatus of the character described, a pneumatic tank adapted to receive a mixture of pulp and water, means for agitating said mixture, means for filling said tank with compressed air above the level of said mixture, means whereby said mixture is atomized and let under air pressure into a separable porous mold where the pulp particles in said mixture are formed into a layer of any desired shape and thickness and the water is eliminated, in combination with means for breaking the contact between said layer and said mold.

6. In an apparatus of the character described, a pneumatic tank adapted to receive a mixture of pulp and water, a suitably perforated inlet-pipe within said tank through which compressed air is admitted for the purpose of agitating said mixture and filling said tank above the level of said mixture with compressed air, means for atomizing said mixture at its point of entry into a feed-pipe, said means consisting of two nozzles, one at the end of an outlet for said mixture and the other at the end of an outlet for said compressed air, so disposed with relation to each other that the compressed air is directed against the said mixture at right angles thereto, said feed-pipe opening into a separable porous mold where by air pressure the pulp is formed into a hollow container of any desired shape and thickness and the water is eliminated, and means for liberating said container from said mold.

7. In an apparatus of the character described, a pneumatic tank adapted to receive a mixture of pulp and water, a suitably perforated inlet-pipe within said tank through which compressed air is admitted for the purpose of agitating said mixture and filling said tank above the level of said mixture with compressed air, means for atomizing said solution consisting of two nozzles so disposed with relation to each other that a column of compressed air expelled through one nozzle from said tank is directed against a column of mixture expelled through the other nozzle from said tank upon its entrance into a feed-pipe opening into a mold; said mold being comprised of hinged sections whose surfaces are provided with innumerable pores for the escape of the moisture in the atomized mixture as the pulp is shaped into a layer against said surfaces by the pressure of compressed air to form a container, and means for removing said container.

8. In an apparatus of the character described, a pneumatic tank adapted to receive a mixture of pulp and water, means for agitating said mixture, means for atomizing said mixture, a feed-pipe for said atomized mixture opening into a separable porous mold comprised of sections hinged at their upper central portions and provided with a separable bottom comprised of sections opening downward and outward, means to limit the downward swing of said bottom sections when said mold is opened, and means for operating said mold.

9. In an apparatus of the character described, means whereby a previously agitated mixture of fibrous pulp and water is atomized and let under air pressure into a separable porous mold for the purpose of forming a layer of pulp of any desired shape and thickness.

10. In an apparatus of the character described, means whereby a previously agitated mixture of fibrous pulp and water is atomized and let under air pressure into a separable porous mold for the purpose of forming a layer of pulp of any desired shape and thickness, in combination with means for removing said layer thus produced.

11. In an apparatus of the character described, means whereby a mixture of fibrous pulp and water is atomized and let under air pressure into a separable porous mold for the purpose of forming a layer of pulp of any desired shape and thickness.

12. In an apparatus of the character described, means whereby a mixture of fibrous pulp and water is atomized and let under air pressure into a separable porous mold for the purpose of forming a layer of pulp of any desired shape and thickness, in combination with means for removing said layer thus produced.

In testimony whereof I have hereunto affixed my signature.

JOHN P. RAYMOND.